No. 829,242. PATENTED AUG. 21, 1906.
J. F. WARNER.
VARIABLE SPEED MECHANISM.
APPLICATION FILED APR. 7, 1905.
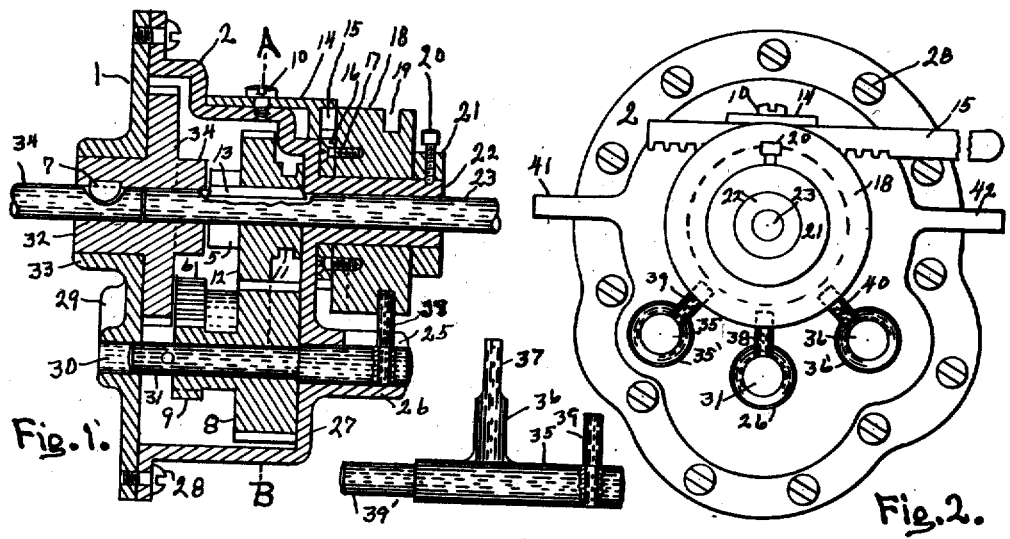
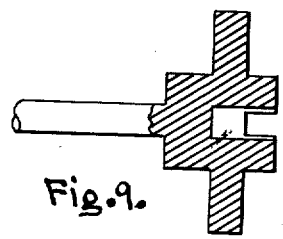
Fig. 9.
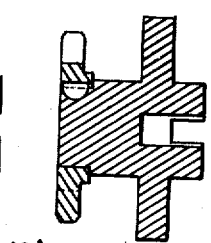
Fig. 12.
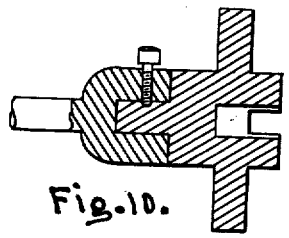
Fig. 10.
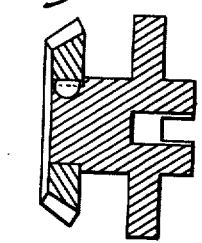
Fig. 13.
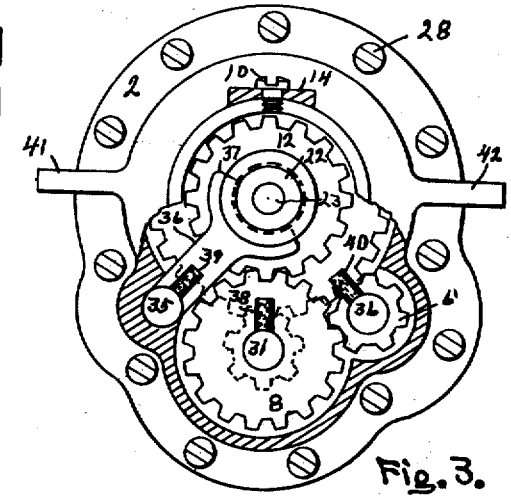
Fig. 3.
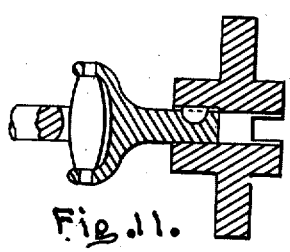
Fig. 11.
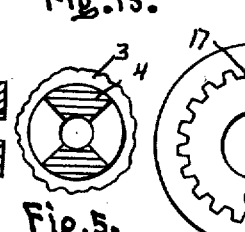
Fig. 5.    Fig. 6.
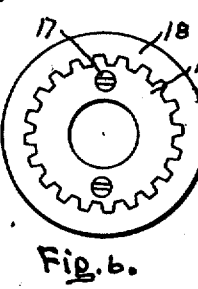
Fig. 7.
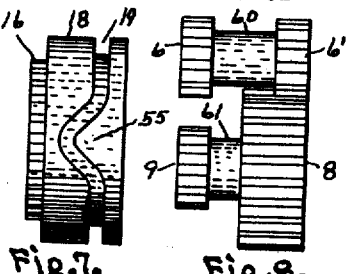
Fig. 8.
WITNESSES:
Chas. E. Watkins.
Cora L. Watkins.
John F. Warner
INVENTOR
BY Hugh L. Warner
ATTORNEY.

UNITED STATES PATENT OFFICE.

JOHN F. WARNER, OF MUNCIE, INDIANA.

VARIABLE-SPEED MECHANISM.

No. 829,242.   Specification of Letters Patent.   Patented Aug. 21, 1906.

Application filed April 7, 1906. Serial No. 254,282.

*To all whom it may concern:*

Be it known that I, JOHN F. WARNER, a citizen of the United States, residing at Muncie, in the county of Delaware and State of Indiana, have invented a new and useful Variable-Speed Device, of which the following is a specification.

My invention relates to variable-speed devices in which a driving-axle and a driven axle are in axial alinement and so geared through a counter-shaft and gears that the speed of the driven axle may be the same as the driving-axle or the speed may be varied or the direction reversed.

My object is to make a variable-speed device with the driving-axle entering one side thereof and the driven axle projecting out of or accessible on the opposite side thereof, and the said device to have a direct drive and to be compact and light and of the fewest possible gears to get a positive drive and to obtain at least two speeds one way and one reverse, one of said speeds to be what is known as a "direct" drive and to have no gears running in mesh on the direct speed; also, to obtain these results by sliding the required gears into mesh, so as to get the desired speed positive and with no slip, or into direct clutch engagement for a direct drive; also, to make the said device very short, preferably by arranging the speed-varying or coupling gears in pairs and mounting them on counter-shafts parallel to the driving-axle, and to obtain the speeds varying from direct speed or direct drive by sliding the coupling-gears carried on counter-shafts, and to leave the direct-driving gear to slide only for direct clutch engagement, at which time the said driving-gear preferably slides out of mesh with the coupling-gear. I obtain these objects with the mechanism illustrated in the accompanying drawings, in which—

Figure 1 is a longitudinal sectional view of my device, showing the driving and driven axles in axial alinement with the driving and driven gears and a counter-shaft carrying a pair of speed-varying or coupling gears and means for sliding said coupling and driving gears. Fig. 2 is an end view of my device, showing the relation of the counter-shafts to each other and to the driving-axle, also showing the speed-varying device and supporting-lugs. Fig. 3 is a section of my device on a line A B, Fig. 1, showing the relation of the entire gear mechanism and the driving-gear shifter. Fig. 4 is a side view of the driving-gear shifter. Fig. 5 is an end view of one of the clutches, the gear proper broken away. Fig. 6 is an end view of the speed-varying controller and the gear-wheel for actuating said controller. Fig. 7 is a side view of said controller, showing the groove and actuating-cam. Fig. 8 is the speed-varying gears in their common relation and shows how they engage each other and their respective preferred shapes. Figs. 9, 10, 11, 12, and 13 show the driven axle made in a variety of forms and in various shapes and still keeps the driven axle in axial alinement with the driving-axle and shows the driven axle adaptable for a variety of driving connections. Figs. 12 and 13 show particularly the driven axle and driven gear made of one piece and a driven member carried on the said driven axle.

Similar numbers refer to similar parts throughout the several views.

My device consists of the hollow casing 2, with the removable cap 1, in which is mounted the driving-axle 23 and driven axle 34 in axial alinement, and parallel to these axles are three separate axles or counter-shafts 35, 31, and 36, arranged to slide longitudinally. These counter-shafts have long bearings 35', 26, and 36 in the hollow case 2 and similar bearings in the cap 1. I put studs 39, 38, and 40 in the counter-shafts, respectively, and these studs fit into a groove 19 in the controller 18, which is rotatively mounted on the extension 22 of the case 2 and held in place by the collar 21 and set-screw 20. The controller is rotated by the rack 15, carried in the support 14, which is secured to casing 2 by screw 10. The teeth in said rack engage a gear 16, secured to controller 18 by screw 17. The stud 38, projecting from counter-shaft 31, slides in a slot 25, cut in the extension 26, which is integral with drum-head 27. Counter-shafts 35 and 36 have similar slots. On the driving-axle 23 and by the feather-key 13 is slidably mounted the driving-gear 12, which has a clutch extension 5 facing and adapted to engage a similar clutch extension 4 on the driven gear 3, which engages with and is mounted on the driven axle 34.

The purpose for which my variable-speed device is to be used requires at times that the driven gear be reversed in direction and at other times to revolve in the same direction as the driving-gear, but slower. In my variable-speed device I use only one gear on the driven axle and only one gear on the driving-axle and these mounted practically side by side, separated only by the clutch extensions 4 and 5, so it requires a coupling-gear 8 and 9 to transmit the power from the driving-gear 12 to the driven gear 3. The coupling-gear consists of two gears made from one piece or of two gears so arranged as to rotate together on the counter-shaft, and the variation of speed between the driving-axle 23 and the driven axle 34 is obtained by making the driving-gear 12 smaller than the driven gear 3 and the coupling-gears 8 and 9 to match. The coupling-gears are carried by a counter-shaft 31 and so arranged that when the controller 18 is rotated the cam portion 55 will push the counter-shaft 31 and coupling-gears 8 and 9 longitudinally into a position where the gear 9 will engage the driven gear 3, and as the gear 8 is twice as wide as the driving-gear 12 gear 8 remains in engagement with the driving-gear 12 and the speed of the driven axle 34 will be slower than the speed of the driving-axle 23, both axles revolving in the same direction. To reverse the direction of the driven axle 34, I slide counter-shaft 36 longidudinally, which carries a single long gear or two gears 6 and 6' (preferably made of one piece) into such position that gear 6 will engage the driven gear 3 and gear 6' will engage gear 8, with which it is in mesh. Then gear 8 acts as an intermediate gear, and I get a reverse motion to the driven axle 34. To get a direct speed, I so rotate the controller 18 that the cam portion 55 will slide the counter-shaft 35, which has a shifter member 37, engaging the groove 11 of the driving-gear 12, which makes clutches 4 and 5 engage each other. This shifting movement slides the driving-gear 12 out of engagement with the large coupling-gear 8, so the direct drive is through no gears and no gears are running idle in mesh.

The coupling-gears 8 and 9 may be made of one piece of material or they may be built up; but to vary the speed of said axles it is necessary to have one of the said gears larger than the other. The reverse coupling-gears 6 and 6' may be made of one or more pieces, or they may be made straight in one long gear, or the two gears may vary in size, owing to what speed I desire on the reverse movement. I show both here the same size. The counter-shafts may be made immovable and the coupling-gears made to slide thereon; but I prefer the counter-shafts to slide longitudinally. The driving-axle 34 is shown in the hub of the driven gear 3; but the driven gear may be made in one piece with the driven axle, as shown in Fig. 9, or the driven gear may be made in one short axle and gear combined in one piece and carry or engage a separate driving member, as shown in Figs. 10, 12, and 13. Fig. 11 shows a universal coupling carried by the driven gear.

With my variable-speed device as shown the driving-shaft enters on one side of the casing and driven member is on the opposite side, so my drive and the variation is through the device as a whole, not in and out on one side, but on opposite sides.

What I claim as new, and desire to secure by Letters Patent, is—

1. In a variable-speed mechanism, the combination with a casing, of a driving and a driven axle in axial alinement, a driving and a driven gear mounted respectively on and rotating with said axles, coupling-gears mounted in said casing, said coupling-gears adapted to slide longitudinally into and out of mesh with said driven gear, said coupling-gears adapted to engage each other.

2. In a variable-speed mechanism, the combination with a casing, of a driving and a driven axle in axial alinement, a driving and a driven gear mounted respectively on and rotating with said axles, coupling-gears mounted in said casing, said coupling-gears adapted to slide longitudinally into and out of mesh with said driven gear, said coupling-gears adapted to engage each other, and clutch members between said driving and said driven gears.

3. In a variable-speed mechanism, the combination with a casing, of a driving and a driven axle in axial alinement, a driving and a driven gear mounted respectively on and rotating with said axles, coupling-gears mounted in said casing, said coupling-gears adapted to slide longitudinally into and out of mesh with said driven gear, said coupling-gears adapted to engage each other, and means for sliding said coupling-gears.

4. In a variable-speed mechanism, the combination with a casing, of a driving and a driven axle in axial alinement, a driving and a driven gear mounted respectively on and rotating with said axles, coupling-gears mounted in said casing, said coupling-gears adapted to slide longitudinally into and out of mesh with said driven gear, and clutch members between said driving and driven gears, said coupling-gears adapted to engage each other.

5. In a variable-speed mechanism, the combination with a casing, of a driving and a driven axle in axial alinement, a driving and a driven gear mounted respectively on and rotating with said axles, coupling-gears mounted in said casing, said coupling-gears adapted to slide longitudinally into and out of mesh with said driven gear, said coupling-gears adapted to engage each other, clutch members between said driving and said driven gears, and means for sliding said coupling-gears.

6. In a variable-speed mechanism, the combination with a casing, of a driving-axle and a driven axle in axial alinement, a driving-gear slidably mounted on said driving-axle and rotating therewith, a driven gear mounted on and rotating with said driven axle, a counter-shaft and a coupling-gear rotatively mounted thereon, said coupling-gear adapted to slide longitudinally and engage the said driven gear, a second counter-shaft and a second coupling-gear rotatively mounted thereon, with one end thereof engaging the first coupling-gear, the second end adapted to engage the said driven gear by sliding longitudinally the said second coupling-gear.

7. In a variable-speed mechanism, the combination with a casing, of a driving-axle and a driven axle in axial alinement, a driving-gear slidably mounted on said driving-axle and rotating therewith, a driven gear mounted on and rotating with said driven axle, a counter-shaft and a coupling-gear rotatively mounted thereon, said coupling-gear adapted to slide longitudinally and engage the said driven gear, a second counter-shaft and a second coupling-gear rotatively mounted thereon, with one end thereof engaging the first coupling-gear, the second end adapted to engage the said driven gear by sliding longitudinally the said second coupling-gear, and means for sliding said coupling-gears.

8. In a variable-speed mechanism, the combination with a casing, of a driving-axle and a driven axle in axial alinement, a driving-gear slidably mounted on said driving-axle and rotating therewith, a driven gear mounted on and rotating with said driven axle, a counter-shaft and a coupling-gear rotatively mounted thereon, said coupling-gear adapted to slide longitudinally and engage the said driven gear, a second counter-shaft and a second coupling-gear rotatively mounted thereon, with one end thereof engaging the first coupling-gear, the second end adapted to engage the said driven gear by sliding longitudinally the said second coupling-gear, and clutch members between said driving and said driven gears.

9. In a variable-speed mechanism, the combination with a casing, of a driving-axle and a driven axle in axial alinement, a driving-gear slidably mounted on said driving-axle and rotating therewith, a driven gear mounted on and rotating with said driven axle, a counter-shaft and a coupling-gear rotatively mounted thereon, said coupling-gear adapted to slide longitudinally and engage the said driven gear, a second counter-shaft and a second coupling-gear rotatively mounted thereon, with one end thereof engaging the first coupling-gear, the second end adapted to engage the said driven gear by sliding longitudinally the said second coupling-gear, and means for sliding said coupling-gears, and clutch members between said driving and said driven gears.

10. In a variable-speed mechanism, the combination with a casing, of a driving-axle and a driven axle in axial alinement, a driving-gear slidably mounted on said driving-axle and rotating therewith, a driven gear mounted on and rotating with said driven axle, a counter-shaft and a coupling-gear rotatively mounted thereon, said coupling-gear adapted to slide and engage both the said driving-gear and the said driven gear, a second counter-shaft, a second coupling-gear rotatively mounted thereon with one end thereof engaging the first coupling-gear, the second end adapted to engage the said driven gear by sliding said second coupling-gear, means for sliding said gears.

JOHN F. WARNER.

Witnesses:
LOUISE PRATHER,
SHELDON HICKMAN.